United States Patent

Columbus et al.

US005306749A

[11] Patent Number: 5,306,749
[45] Date of Patent: Apr. 26, 1994

[54] THIXOTROPIC WOOD ADHESIVE GEL

[75] Inventors: Peter S. Columbus, Melville, N.Y.; John Anderson, Hilliard; Yogeshbai B. Patel, Gahanna, both of Ohio

[73] Assignee: Borden, Inc., Columbus, Ohio

[21] Appl. No.: 77,023

[22] Filed: Jun. 15, 1993

Related U.S. Application Data

[63] Continuation-in-part of Ser. No. 976,553, Nov. 16, 1992.

[51] Int. Cl.$^5$ ............................................. C08L 29/04
[52] U.S. Cl. ..................................... 524/13; 524/55; 524/503; 524/916; 428/537.1
[58] Field of Search .................. 524/13, 55, 503, 916; 428/537.1

[56] References Cited

U.S. PATENT DOCUMENTS

| | | | |
|---|---|---|---|
| 2,510,257 | 6/1950 | Robinson | 524/354 |
| 3,256,221 | 6/1966 | Cooper | 524/44 |
| 3,442,845 | 5/1969 | Columbus et al. | 524/388 |
| 3,676,174 | 7/1972 | Spector | 428/451 |
| 4,251,400 | 2/1981 | Columbus | 524/24 |
| 4,282,120 | 8/1981 | Cisterni | 524/13 |
| 4,638,022 | 1/1987 | Cope | 524/15 |
| 4,687,793 | 8/1987 | Motegi et al. | 524/13 |
| 4,801,631 | 1/1989 | Sachs et al. | 524/13 |

FOREIGN PATENT DOCUMENTS

| | | | |
|---|---|---|---|
| 0210052 | 1/1987 | European Pat. Off. | B65D 35/14 |

OTHER PUBLICATIONS

The Handbook of Adhesives, Third Ed. I. Skeist, pp. 388–390; 394–395; and 398.
Keczan, Xanthan Gum, (Tech Bull DB-15) of Merck & Co.
Kelco Xanthan Gum, Third Ed. of Kelco, a division of Merck & Co.

*Primary Examiner*—George F. Lesmes
*Assistant Examiner*—Blaine Copenheaver
*Attorney, Agent, or Firm*—George P. Maskas; Dennis H. Rainear; Kenneth P. Van Wyck

[57] ABSTRACT

A water based thixotropic adhesive gel is disclosed which comprises; an aqueous emulsion of polyvinyl acetate in an amount sufficient to form adhesive bonds on wood; partially hydrolyzed polyvinyl alcohol in an amount sufficient to provide wet tack of the adhesive; glyoxal in an amount sufficient to provide water resistance to the adhesive; and wood flour in an amount sufficient to increase the water resistance imparted by the glyoxal and to provide sanding and staining properties to the adhesive; and xanthan gum in an amount sufficient to provide a thixotropic index and viscosity allowing extrusion of the gel from a flexible dispenser having a dispensing opening of about 0.073 inches in diameter by applying finger-pressure to the dispenser while, upon extrusion, the gel forms a bead which does not run when applied in a horizontal line on wood in a vertical plane.

17 Claims, No Drawings

THIXOTROPIC WOOD ADHESIVE GEL

This application is a continuation-in-part of our co-pending application Ser. No. 07/976,553 which was filed on Nov. 16, 1992 and which is incorporated herein, in its entirety, by reference.

BACKGROUND OF THE INVENTION

1. Field of the Invention

This invention relates to thixotropic, water based, general purpose, polyvinyl acetate adhesive gels for wood.

2. Background Art

Many different general purpose adhesives for wood are available. However, such adhesives have various shortcomings such as excessive running when placed on a vertical surface, and difficulty of the dried adhesive: (a) to take a conventional wood stain; (b) to be sanded; or (c) to resist moisture.

This invention provides a thixotropic adhesive gel which can be easily dispensed from a conventional hand held plastic squeeze bottle for wood glue. After being dispensed from the squeeze bottle, the adhesive does not run on vertical surfaces and forms a dry glue line which can be sanded, stained and has resistance to moisture.

The adhesive of this invention comprises and preferably consists essentially of: polyvinyl acetate as the primary adhesive agent; xanthan gum as a thixotropic thickening agent; polyvinyl alcohol as a tackifying agent; and a combination of both wood flour and glyoxal as water resisting agents for the dried adhesive. Additional conventional ingredients used in adhesive compositions such as defoamers, preservatives, and the like can also be use provided that such ingredients or the quantity thereof do not adversely affect the adhesives.

Water based polyvinyl acetate emulsions are popular wood glues. The Handbook of Adhesives, Third Edition which is edited by I. Skeist: pages 388–390 describes the use of polyvinyl alcohol for imparting wet tack and as a protective colloid for polyvinyl acetate emulsions; pages 394–395 discusses thixotropy, pseudoplasticity and thickening of polyvinyl acetate with various materials; and page 398 describes the use of foam control agents and biocides in such adhesives.

U.S. Pat. No. 3,442,845 of May 6, 1969 to P. Columbus et al. relates to polyvinyl acetate adhesives which, upon drying, are redispersible in cold or hot water. The adhesive compositions of the 845 patent use polyvinyl alcohol, water-soluble gums, and cellulose ethers as anti-coalescing agents for the polyvinyl acetate. Propylene glycol and other polyhydroxy compounds are mentioned as plasticizers for polyvinyl alcohol.

U.S. Pat. No. 4,251,400 of Feb. 17, 1981 to P. Columbus also relates to a polyvinyl acetate adhesive which is redispersible in hot and cold water in the dried film form and which uses polyvinylpyrrolidone and a non-volatile, water-soluble, plasticizer as the anti-coalescing agent. In addition to the polyvinyl acetate and polyvinylpyrrolidone that patent also mentions the use of polyvinyl alcohol, propylene glycol, as well as water-soluble ethers in the adhesive composition.

European Patent Application Publication Number 0210052 to Locktite which was published on Jan. 28, 1987 relates to various tubes for dispensing reactive adhesives such as cyanoacrylate at a rate of one or two drops at a time. The patent mentions resilient plastic tube dispensers and broadly states that the adhesive can be thixotropic.

Technical Bulletin DB-15 entitled "KELZAN, Xanthan Gum", of Merck & Co. describes xanthan gum as a thickener and suspending agent for water based systems and promotes its suspending, pseudoplastic (thixotropic), and stability properties.

KELCO XANTHAN GUM, Third Edition, of Kelco a division of Merck & Co. shows much the same as the above KELZAN bulletin, and also states that its xanthan gum provides smooth flow under sheer in adhesive formulations and that this allows the application of high solids.

U.S. Pat. No. 3,676,174 Uses a mixture of wood flour and plaster of Paris to form a paintable base for molded articles. In Col. 2, step 5, it discloses a composition of: I part plaster of Paris; 1 part of wood flour; and 6 parts fine metal powder. This dry powder is mixed with an equal quantity of polyvinyl acetate solution diluted with water and is used as a coating on clay objects.

U.S. Pat. No. 2,510,257 Discloses an aqueous polyvinyl acetate emulsion adhesive containing glyoxal and polyvinyl alcohol. The glyoxal imparts water resistance to the adhesive.

U.S. Pat. No. 4,638,022 Uses polyvinyl acetate together with pecan shell flour to provide a coating for wood or plastic which accepts conventional wood stains. The composition of this reference appears to be in an organic solvent system.

A commercial product called "Glue Gap 202 GF Filling" of the Garott Wade Company, Inc. which is located at 161 Sixth Avenue, New York, N.Y. is an aqueous polyvinyl acetate emulsion adhesive which contains wood fibers or wood flour. This product is viscous but has little or no thixotropy; also, much of the wood fiber appears to settle easily and requires shaking to disperse the wood fibers.

SUMMARY OF THE INVENTION

A thixotropic water based polyvinyl acetate adhesive gel is provided which contains polyvinyl alcohol, xanthan gum, wood flour and glyoxal. The wood flour and glyoxal act synergistically to provide a much higher level of water resistance to the dried adhesive as compared to a similar composition without wood flour but containing the same level of glyoxal. Due to its thixotropic properties, the viscosity of the adhesive will break down when a flexible tube or squeeze bottle is finger-pressed and have a sufficiently low viscosity to allow for easy, steady, and continuous extrusion from a small orifice such as one having a diameter of about 0.06 to 0.15 inches or a typical rectangular glue applicator slit of about 1/16 inches wide and 5/16 inches long. When pressure is released after the desired amount of adhesive flows out of the orifice, the adhesive quickly reverts to very close to its original gel state so that a horizontal line of the gel will not run when applied to a vertical surface of a porous substrate such as wood. The adhesive has good wet tack and a rate of set which permits repositioning of two wood substrates while the adhesive is drying therebetween.

Additional aspects of the invention will be evident from a reading of the entire specification and claims.

DETAILED DESCRIPTION OF THE INVENTION

The adhesives of this invention are aqueous dispersions, also referred to herein as emulsions, which contain polyvinyl acetate in an amount sufficient to provide an adhesive bond upon drying; polyvinyl alcohol in an amount sufficient to increase the wet tack of the adhesive; glyoxal in an amount sufficient to provide water resistance to the dried adhesive; wood flour in an amount which, together with the glyoxal, acts synergistically to increases water resistance imparted by the glyoxal; and xanthan gum in an amount sufficient to provide a thixotropic index of from about 1.5 to 7 when viscosity of the gel at 20 RPM (revolutions per minute) is divided into the viscosity of the gel at 2 RPM at 25° C. as measured with an RVF Brookfield viscometer using a number 6 spindle. The wood flour also permits sanding and staining of the dried adhesive.

The gel of this invention has good wet tack properties. It has a slow enough rate of set that permits a sufficient period of time for positioning a second piece of wood such as by sliding of the second surface over the first before wood fiber tearing adhesive bonds develop between the two substrates which permanently hold the pieces in place.

The water, polyvinyl acetate, polyvinyl alcohol, xanthan gum, glyoxal, and wood flour will generally make up (compose) at least 90%, preferably 95%, and particularly 98% of the adhesive composition.

The Xanthan Gum

Xanthan gum is a natural high-molecular weight branched polysaccharide. It functions as a hydrophilic colloid to thicken, suspend, and stabilize water-based systems. The quantity of xanthan gum used in this invention is that which is sufficient to provide the adhesive gel with the desired thixotropic index and viscosity. Such quantity can vary over a broad range such as that of about 0.1% to 1.5% by weight of the adhesive, and preferably the quantity of xanthan gum will vary from about 0.2% to 0.8% by weight of the adhesive.

Other water soluble thickening agents were tried for use in this invention but were found unsatisfactory due to immiscibility, lack of adequate stability, or they adversely affected water resistance of the dried adhesive. These other thickening agents which were not found suitable include: hydroxyethyl cellulose; alginates; the sodium salt of carboxymethyl cellulose (CMC), and polyvinylpyrrolidone. The superiority of xanthan gum over other hydrophilic gums such as CMC was unexpected. CMC is a preferred hydrophilic gum used as the thickening agent for the gels of the parent case to this application. However, the gels of the parent case do not contain dispersed polyvinyl acetate, glyoxal or wood flour and only optionally contain xanthan gum as the thickening agent.

The term "thixotropic" as used herein is also meant to cover pseudoplastic. The thixotropic index used in this invention permits extrusion of the gel from a small dispenser opening by use of finger-pressure on a flexible dispenser such as a tube or squeeze bottle. Due to thixotropy, the adhesive rapidly reverts to a higher viscosity after extrusion from the orifice when force or shear is not being applied. The adhesive gel does not run, when applied to wood in a vertical plane after being extruded through the small orifices of the dispensers used in this invention. By not running, the adhesive fairly stays in place on the area to which it is extruded with minimal spreading unless external force is applied. The minimum spreading can include a slight amount of downward creep due to gravity such as that of less than 0.15 inches and preferably less than 0.1 inches. The use of smaller orifices in the dispensers such as those of less than 0.1 inches in diameter, e.g., 0.073 inches in diameter minimize any creep.

The thixotropic index for the adhesive gel of this invention varies from about 1.5 to 7 preferably about 2 to 5 and particularly 2.5 to 4.0. The term "thixotropic index" as used herein is the number obtained by dividing the viscosity reading of the gel at 2 RPM (revolutions per minute) in centipoise by the viscosity reading at 20 RPM in centipoise by use of an RVF Brookfield viscometer using a number 6 spindle at 25° C.

The viscosity readings in this invention are taken after the gel has been at rest e.g. undisturbed, for a period of time such as 12 hours. The adhesive gels of this invention are stable.

In order to prevent settling of the wood flour in the adhesive and to prevent running after being extruded from a squeeze bottle, the adhesive of this invention has a high viscosity at rest or under low shear. However, due to its thixotropic properties it will pour out of an open mouth container or flow to a lower level when the container is tipped. This facilitates the discharge of the adhesive from plastic bottle glue dispensers having small openings. On the other hand, a non-thixotropic adhesive or adhesive with little thixotropy at the viscosities used in this invention present difficulties in removal from a plastic bottle having a small orifice and particularly in removal of substantially all of the adhesive.

The adhesive gels of this invention have a viscosity of about 15,000 cps (centipoise) to 350,000 cps at 25° C. and preferably about 40,000 cps to 120,000 cps at 25° C. as measured with an RVF Brookfield viscometer by use of a number 6 spindle at 2 RPM (revolutions per minute). When measured at 20 RPM with an RVF Brookfield viscometer at 25° C. by use of a No. 6 spindle, the viscosity is about 10,000 cps to 50,000 cps, preferably about 14,000 cps to 35,000 cps, provided that the thixotropic index is within the ranges set forth herein.

Polyvinyl Acetate

The adhesive agent used in this invention is principally polyvinyl acetate although polyvinyl alcohol also forms adhesive bonds.

The polyvinyl acetate can have a molecular weight such as that which is conventional with polyvinyl acetate wood glues, e.g., about 30,000 to 200,000. Preferably, the molecular weight of the polyvinyl acetate is from about 30,000 to 100,000 although higher or lower molecular weight resins can be used. It is preferred to use polyvinyl acetate emulsions that are homopolymer dispersions (emulsion) with a total solids content of about 40% to 65% by weight of the polyvinyl acetate emulsion.

Polyvinyl Alcohol

The term "polyvinyl alcohol" as used throughout the specification and claims is intended to include both completely hydrolyzed and partially hydrolyzed polyvinyl alcohols such as those which are useful as emulsifying agents in polyvinyl acetate aqueous emulsions.

The polyvinyl alcohol will preferably be partially hydrolyzed and have a molecular weight of about 25,000 to 100,000 and preferably about 40,000 to 80,000. The viscosity of the polyvinyl alcohol can vary over a wide range such as that of about 5 or 6 cps, which is referred to in the art as low viscosity, to 40 to 50 cps, which is referred to in the art as high viscosity as measured with an RVF Brookfield viscometer using a number 1 spindle at 60 RPM at 20° C. for a 4% aqueous solution. The preferred degree of hydrolysis for the partially hydrolyzed polyvinyl alcohol is about 87% to 89%. The partially hydrolyzed polyvinyl alcohol is preferred for consumer products in contrast to industrial applications. The reason for this is that the use of fully hydrolyzed polyvinyl alcohol provides to the composition a reduced general stability, e.g., a lack of freeze-thaw stability, and exhibits syneresis on standing for a relatively short period of time.

The quantity of polyvinyl alcohol in the gel is that which will increase the wet tack of the adhesive. This can vary over a wide range such as that of from about 1.5% to 15% by weight of the adhesive and preferably from about 2.5% to 7%. often, polyvinyl acetate emulsions use small quantities of partially hydrolyzed polyvinyl alcohol as a protective colloid. The total amount of polyvinyl alcohol in the adhesives of this invention include that which may be used as a protective colloid in the polyvinyl acetate emulsion as well as any further additions such as that for increasing wet tack of the adhesive.

The Glyoxal

The glyoxal acts synergistically with the wood flour to provide water resistance to the dried adhesive. The quantity of glyoxal used in this invention is that which is sufficient to provide water resistance to the dried adhesive. Glyoxal, in a quantity of as little as about 0.005% by weight of the adhesive can be sufficient. The quantity of glyoxal will generally vary from about 0.005% to 0.4% by weight of the adhesive, preferably from about 0.01% to 0.2% by weight of the adhesive and particularly from about 0.02% to 0.1%. Larger quantities of the glyoxal can be used but larger quantities adversely affect stability, e.g., freeze-thaw stability and promote excessive thickening of the composition on aging. The glyoxal is generally incorporated into the adhesive in the form of an aqueous solution, e.g., a 20% to 50% solution of the glyoxal in water.

Plasticizers

Optionally, a water soluble plasticizer for the polyvinyl alcohol can also be used in the composition. Such plasticizers soften the polyvinyl alcohol and make the polyvinyl alcohol more flexible. Illustrative of such plasticizers there can be mentioned: alkanes having from 2 to 5 carbon atoms and 2 to 3 hydroxyl groups such as: propylene glycol; glycerol; ethylene glycol; and diethylene glycol; although ethylene glycol and diethylene glycol can have some toxic properties. The quantity of the water-soluble plasticizer is that which is sufficient to plasticize the polyvinyl alcohol and will generally vary from about 0.5 to 3% by weight of the adhesive gel. Although such plasticizers can be used it is preferred to avoid them when higher water resistance is desired.

Water insoluble plasticizers for the polyvinyl acetate can also be used in the adhesives of this invention. Illustrative of such plasticizers there can be mentioned: butyl benzyl phthalate; dibutyl phthalate; tricresyl phosphate; and the like. When used, the quantity of the water insoluble plasticizer will generally be less than one percent, e.g. from about 0.1% to 0.5% by weight of the adhesive.

Wood Flour

The wood flour, after incorporation and suspension in the glue, can easily pass through an 0.073 inch diameter orifice in the compositions of this invention. The wood flour remains suspended in the gel for a prolonged period of time, e.g., at least one month without significant settling, and does not interfere with smooth discharge of the gel from the dispenser orifice. The wood flour is that of finely divided particles of wood which generally has a particle size ( U.S. Standard Sieve Series) of less than about 10 mesh (2,000 microns), and preferably less than 20 mesh (850 microns). Such wood flour can be that of hardwood, e.g., maple, or soft wood, e.g., soft pine. The preferred wood flour is that of softwood.

Water

The total quantity of water includes water from the polyvinyl acetate emulsion used in making the adhesive, if the polyvinyl acetate is incorporated in the adhesive as an aqueous polyvinyl acetate emulsion. The total quantity of water includes additional quantities of water added in the preparation of the adhesive as well as that carried by the component ingredients. The quantity of water will generally vary from about 40% to 85% by weight of the adhesive, preferably 45% to 75% and particularly 50% to 65%.

The Water-Soluble Defoamer

Conventional water-soluble defoamers are generally used in the adhesives of this invention. Such defoamers include silane defoamers and polyalkoxylated polyethers e.g., butoxy polyoxyethylene-propoxyl propylene glycol. The quantity of the defoamer is that which maintains density of the gel, prevents excessive foam in the manufacturing process, and facilitates filling of the dispensers with the gel. Generally, the quantity of the defoamer varies from about 0.05% to 0.35% by weight of the gel composition.

The Dispenser

The dispenser for the thixotropic adhesive gel can be a conventional, flexible, low density polyethylene squeeze bottle such as one having a capacity of 4 fluid ounces. Illustratively, the four fluid ounce plastic squeeze bottle used for ELMER'S SCHOOL GLUE of Borden, Inc. is suitable. Such dispensers are shown in the above mentioned copending patent application which is incorporated herein by reference in its entirety. Finger-pressure between the thumb and forefinger or the thumb and fingers is used to dispense the gel from the dispenser squeeze bottle on to a substrate such as wood. The dispenser cap orifice has a diameter of about 0.06 to 0.15 inches, preferably 0.07 to 0.10 inches and particularly about 0.07 to 0.08 inches. The use of a rectangular slit of approximately one sixteenth of an inch wide and five sixteenths of an inch long as found in many wood glue dispensers is also suitable. The thixotropic gel adhesive flows out of the cap orifice in a steady stream on being finger-pressed due to its thixotropic properties in spite of its high viscosity in the undisturbed state. The area of such dispenser opening is from about 0.011 to about 0.12 square inches.

A preferred method for manufacture of the adhesive gel of this invention is as follows: Water is added to a tank equipped with a mixer and the mixer is started. Polyvinyl alcohol and xanthan gum are sprinkled into the mixture. An antifoam agent is then added and mixing is continued until the polyvinyl alcohol is "wet-out" and softened. The mixing is continued and the temperature is raised to 85° C. to 90° C. until a smooth homogeneous mixture is obtained. The mixture is then cooled to about 75° C. with continued mixing and a polyvinyl acetate aqueous emulsion is added such as an emulsion containing about 50% of the polyvinyl acetate emulsified with about 3% of polyvinyl alcohol and the remainder being water. Mixing is continued and the temperature is lowered to about 50° C. and then glyoxal, wood flour and any preservatives are added. Mixing is continued until the mixture is smooth and homogeneous.

In order that those skilled in the art may more fully understand the invention presented herein, the following examples are set forth. All parts and percentages in the examples, as well as elsewhere in this application, are by weight, unless otherwise specifically stated. The viscosity measurements referred to herein are by use of an RVF Brookfield viscometer with a number 6 spindle at 25° C. unless otherwise specifically stated. The term "Low Shear" refers to the viscosity measurements at 2 RPM (revolutions per minute) whereas "High Shear" refers to viscosity measurements taken at 20 RPM.

EXAMPLE 1

This example shows the composition and properties of an adhesive gel of this invention.

| Ingredient | Parts By Weight |
|---|---|
| Deionized water | 54.6 |
| Polyvinyl Acetate | 33.5 |
| Polyvinyl alcohol[1] | 4.0 |
| Wood Flour[2] | 6.2 |
| KELZAN-S[3] | 0.5 |
| Glyoxal[4] | 0.04 |
| DEFOAMER[5] | 0.26 |
| Ethyl parahydroxybenzoate | 0.1 |
| Benzoflex 9-88[6] | 0.2 |
| Propylene Glycol | 0.6 |

[1]Partially hydrolyzed polyvinyl alcohol.
[2]Pine wood flour No. 14020 of American Wood Fibers, Inc.
[3]A dispersible grade of xanthan gum sold by Merck & Co.
[4]As a 40% solution of glyoxal in water
[5]DEFOAMER 622 which is a monofunctional polyalkoxylated polyether defoamer supplied by the Thomas W. Dunn Corp of Ridgefield, N.J.
[6]A plasticizer for polyvinyl acetate which is sold by Vesical Chemical Corp. of Chicago, Ill The adhesive of EXAMPLE 1 was easily dispensed with finger-pressure from a resilient plastic four ounce polyethylene bottle having a cap with an orifice of about 0.073 inches diameter. After being dispensed on to a piece of pine wood held vertically, it formed a uniform, thin, horizontal bead of adhesive which did not run and formed wood fiber tearing adhesive bonds between two pieces of wood on drying. The gel can be dispensed in a steady stream through the dispenser orifice. It had a thixotropic index of about 3.5 about 24 hours after it was manufactured and a viscosity of 115,000 cps at a spindle speed of 2 RPM and a viscosity of 32,500 cps at a spindle speed of 20 RPM when measured at 25° C. with an RVF Brookfield viscometer with an No. 6 spindle. Subsequent viscosity measurements by use of the same method and equipment were as follows: after standing for about 2 days a viscosity of 117,500 cps at 2 RPM and a viscosity of 33,000 cps at 20 RPM; after 3 days from manufacture, a viscosity of 135,000 cps at 2 RPM and 34,500 cps at 20 RPM.

EXAMPLE 2

This example provides another formulation having the advantageous properties of this invention.

| Ingredient | Parts By Weight |
|---|---|
| Water | 55.53 |
| Polyvinyl Acetate | 33.5 |
| Partially Hydrolyzed Polyvinyl Alcohol | 4.0 |
| KELZAN-S, Xanthan Gum[1] | 0.4 |
| Glyoxal[2] | 0.07 |
| Pine Wood Flour[3] | 6.0 |
| KATHON LX 1.5%[4] | 0.1 |
| SKANE M8[5] | 0.1 |
| COLLOIDS 581[6] | 0.3 |

[1]A product of Merck & Co.
[2]Diluted in water
[3]Pine wood flour No. 14020 of American Wood Fibers, Inc.
[4]A microbicide product of Rohm and Haas
[5]A microbicide product of Rohm & Haas Company
[6]Defoamer product of Rhone-Poulanc As with EXAMPLE 1, the adhesive dispensed easily form a 0.073 inch diameter orifice of a plastic dispenser bottle and a bead of the adhesive when dispensed on a vertical surface did not run. After manufacture the adhesive had a viscosity at 2 RPM of 80,000 to 90,000 cps at 2 RPM spindle speed at 25° C. and a viscosity of 22,000 to 26,000 cps at 20 RPM spindle speed at 25° C. for a thixotropic index of 3.5. After 2 days from manufacture the viscosity at 2 RPM was 89,000 cps and 24,000 cps at 20 rpm for a thixotropic index of 3.3. After two weeks from manufacture the viscosity at 2 RPM was 85,000 cps and the viscosity at 20 RPM was 25,000 cps. All viscosity measurements were made by use of an RVF Brookfield viscometer with a number 6 spindle at 25° C.

EXAMPLE 3

An adhesive gel was prepared with a composition the same as that of EXAMPLE 1 except that 1.20 % of hydroxyethyl cellulose was used as the thickening agent and about 0.7% less water was used so as to balance the additional hydroxyethyl cellulose. It was found that the hydroxyethyl cellulose was incompatible in the product since it quickly separates from the mixture leaving the mixture watery and with non-uniform clumping throughout.

EXAMPLE 4

An adhesive gel was prepared with the same composition as EXAMPLE I except that 1.65% of polyvinylpyrrolidone and 0.60% of carboxymethyl cellulose were used as the thickening agents. Again, proportionately less water was used to make up for the increased amount of thickening agent. The viscosity of the gel showed rapid deterioration and was not suitable for use in this invention.

EXAMPLE 5

An adhesive gel was prepared with the identical ingredients as that of EXAMPLE 1 except that 0.6% of carboxymethyl cellulose(CMC) was used in place of 0.5% of the xanthan gum and the quantity of water was decreased by 0.1% to compensate for the lower amount of thickener. This formulation was unsatisfactory because the viscosity deteriorated. Thus, the initial viscosity at 2 RPM was 145,000 cps and at 10 RPM it was 75,000 cps. Ten RPM speed was used as the higher speed because the viscosity could not be read on the instrument scale at 20 RPM due to the high viscosity. After 2 days from the date of manufacture the viscosity was down to 45,000 cps at 2 RPM and 27,000 cps at 20 RPM. After one week from the date of manufacture, the viscosity was 25,000 cps at 2 RPM and 17,5000 at 20 RPM. Two weeks after the time of manufacture, the viscosity was 15,000 cps at 2 RPM and 20,500 cps at 20 RPM. The viscosity measurements were made in the same manner as in EXAMPLE 2. It can be seen that both the viscosity and the thixotropic index deteriorated rapidly with the use of CMC as the thixotropic agent.

EXAMPLE 6

This example shows the synergistic effect of glyoxal and wood flour for attaining water resistance of the dried adhesive gel of this invention.

Four samples of adhesive gels were used in this Example. Sample 4 was the adhesive gel of EXAMPLE 2 above. The composition of Sample 1 was the same as that of EXAMPLE 2 except that it contained neither glyoxal nor wood flour without any other change in the formulation. The composition of Sample 2 was the same as EXAMPLE 2 except that it contained no wood flour without any other change in the formulation. The composition of Sample 3 was the same as that of EXAMPLE 2 except that it contained no glyoxal without any other change in the formulation. Each of the samples were drawn down with a No. 34 wire wrap rod to about a two inch width band of adhesive film on a glass plate. The drawn down adhesives were permitted to dry by standing at 75° F. and 50% relative humidity for 6 days before proceeding with the following tests.

Two series of tests were performed. In the first series, a drop of deionized water was placed on each of the drawn down adhesives and the time it took for each film to blush (slight white discoloration) was measured. Film with longer times for discoloration is film which is more resistant to water. Immediately after discoloration was noted, the area of film under the drop of water was rubbed with the finger. Easy dispersibilty of the film under the drop of water indicates poor water resistance whereas difficulty in dispersibility of the affected area under the drop of water indicates better water resistance. In this series of tests the time for the film to blush was: 2 seconds for Sample 1; 9 seconds for Sample 2; 3 seconds for Sample 3; and 35 seconds for Sample 4. In this series of tests, rubbing of the film area under the drop of water showed: easy dispersion for Sample 1; some dispersion of Sample 2; easy dispersion of Sample 3; and no dispersion of Sample 4.

In the second series of tests, a drop of water was permitted to stay on each of the samples until the area under the water turned opaque (an opaque white or off-white coloration). For the film area under the drop of water, it took: 1 minute to become opaque for Sample 1 and the film was easily dispersed in water with finger rubbing; 2 minutes to become opaque for Sample 2 and there was some dispersion of the film with finger rubbing; 1 minute to become opaque for Sample 3 and the film was readily dispersed with the finger rubbing; 45 to 60 minutes to become opaque for Sample 4 and the film did not disperse with finger rubbing but instead broke away in large fragments.

It was also observed that the drop of water for Sample 4 in both series of tests showed "beading" which was not shown in the other samples. Beading is an indication of a hydrophobic surface as opposed to a hydrophilic surface.

It can be seen from EXAMPLE 6 that the glyoxal and wood flour in the compositions of this invention act synergistically to increase water resistance of the dried adhesive.

EXAMPLE 7

This example can provide another formulation having the advantageous properties of this invention.

| Ingredient | Parts By Weight |
| --- | --- |
| Water | 66.0 |
| Polyvinyl Acetate | 22.0 |
| Partially Hydrolyzed Polyvinyl Alcohol | 5.0 |
| Wood Flour | 5.6 |
| Xanthan Gum | 1.0 |
| Glyoxal | 0.1 |
| Defoamer | 0.3 |

EXAMPLE 8

This example can provide another formulation having the advantageous properties of this invention.

| Ingredient | Parts By Weight |
| --- | --- |
| Water | 60.0 |
| Polyvinyl Acetate | 20.0 |
| Fully Hydrolyzed Polyvinyl Alcohol | 3.0 |
| Wood Flour | 15.4 |
| Xanthan Gum | 1.2 |
| Glyoxal | 0.2 |
| Defoamer | 0.2 |

What is claimed is:

1. An aqueous thixotropic adhesive gel emulsion comprising, by weight:
  A. about 40% to 85% of water;
  B. about 10% to 45% of polyvinyl acetate;
  C. about 1.5% to 15% of polyvinyl alcohol;
  D. about 0.1 to 1.5% of xanthan gum;
  E. about 0.005 to 0.4% of glyoxal; and
  F. about 2% to 20% of wood flour.

2. The gel of claim 1, wherein: the quantity of thickening agent is sufficient to provide a thixotropic index of from about 1.5 to 7 when viscosity of said gel at 20 RPM is divided into the viscosity at 2 RPM of said gel at 25° C. as measured with an VF Brookfield viscometer using a number 6 spindle, and wherein upon extrusion from the dispensing opening, the gel forms a bead which does not run when applied in a horizontal line on wood in a vertical plane.

3. The gel of claim 1 wherein the thixotropic index is from about 2 to 5.0 and the quantity of wood flour is sufficient to provide staining and sanding properties to the dried adhesive.

4. The gel of claim 1 containing from about 0.05% to 0.3% by weight of a water-soluble defoamer.

5. The gel of claim 1 comprising, by weight, about:
  A. 45% to 75% water;
  B. 20% to 40% of polyvinyl acetate;
  C. 2.5% to 7% of polyvinyl alcohol;
  D. 0.2% to 0.8% of xanthan gum;
  E. 0.01% to 0.2% of glyoxal; and
  F. 3% to 15% of wood flour.

6. The gel of claim 2 wherein at least 95%, by weight, of the gel is composed of water, polyvinyl acetate, partially hydrolyzed polyvinyl alcohol, xanthan gum, glyoxal, and wood flour.

7. The gel of claim 1 which has a viscosity of 15,000 cps to 350,000 cps at Low Shear.

8. The gel of claim 9 which has a thixotropic index of about 1.5 to 7.

9. The gel of claim 8 which contains from about: 45% to 75% water; 20% to 40% polyvinyl acetate; 2.5% to 7% of polyvinyl alcohol; 0.2% to 0.8% of xanthan gum; 0.02% to 0.1% of glyoxal; and 4% to 8% of wood flour.

10. The gel of claim 9 wherein at least 98% thereof is composed of: water, polyvinyl acetate, polyvinyl alcohol; glyoxal; wood flour; and xanthan gum.

11. A process for preparing an aqueous emulsion of a thixotropic adhesive gel which comprises mixing, by weight:
   A. about 40% to 85% of water;
   B. about 10% to 45% of polyvinyl acetate;
   C. about 1.5% to 15% of polyvinyl alcohol;
   D. about 0.1% to 1.5% of xanthan gum;
   E. about 0.005% to 0.4% of glyoxal;
   F. about 2% to 20% of wood flour to form a gel having a thixotropic index of about 1.5 to 7, a Low Shear viscosity of about 15,000 cps to 350,000 cps, and a High Shear viscosity of about 10,000 cps to 50,000 cps.

12. An adhesive gel prepared by the process of claim 11.

13. The process of claim 11 which comprises mixing:
   A. 45% to 75% water;
   B. 20% to 40% of polyvinyl acetate;
   C. 2.5% to 7% of polyvinyl alcohol;
   D. 0.2% to 0.8% of xanthan gum;
   E. 0.01% to 0.2% of glyoxal; and
   F. 3% to 15% of wood flour to form said gel having a thixotropic index of about 2 to 5, a Low Shear viscosity of 40,000 cps to 120,000 cps and a High Shear viscosity of 14,000 cps to 35,000 cps.

14. The process of claim 11 wherein the polyvinyl alcohol is partially hydrolyzed.

15. The process of claim 11 which comprises mixing, by weight:
   A. 50% to 65% of water;
   B. 20% to 40% of polyvinyl acetate;
   C. 2.5% to 7% of polyvinyl alcohol;
   D. 0.2% to 0.8% of xanthan gum;
   E. 0.02% to 0.1% of glyoxal; and
   F. 3% to 15% of wood flour.

16. The process of claim 15 wherein the quantity of wood flour is from 4% to 8% and wherein at least 95% of the mixture is composed of water, polyvinyl acetate, polyvinyl alcohol, xanthan gum, glyoxal, and wood flour.

17. An adhesive composition prepared by the process of claim 15 wherein the dried adhesive is sandable and stainable.

* * * * *